May 10, 1932.  H. D. CARLTON  1,857,139
PRESSURE GAUGE INDICATOR
Filed Aug. 18, 1927
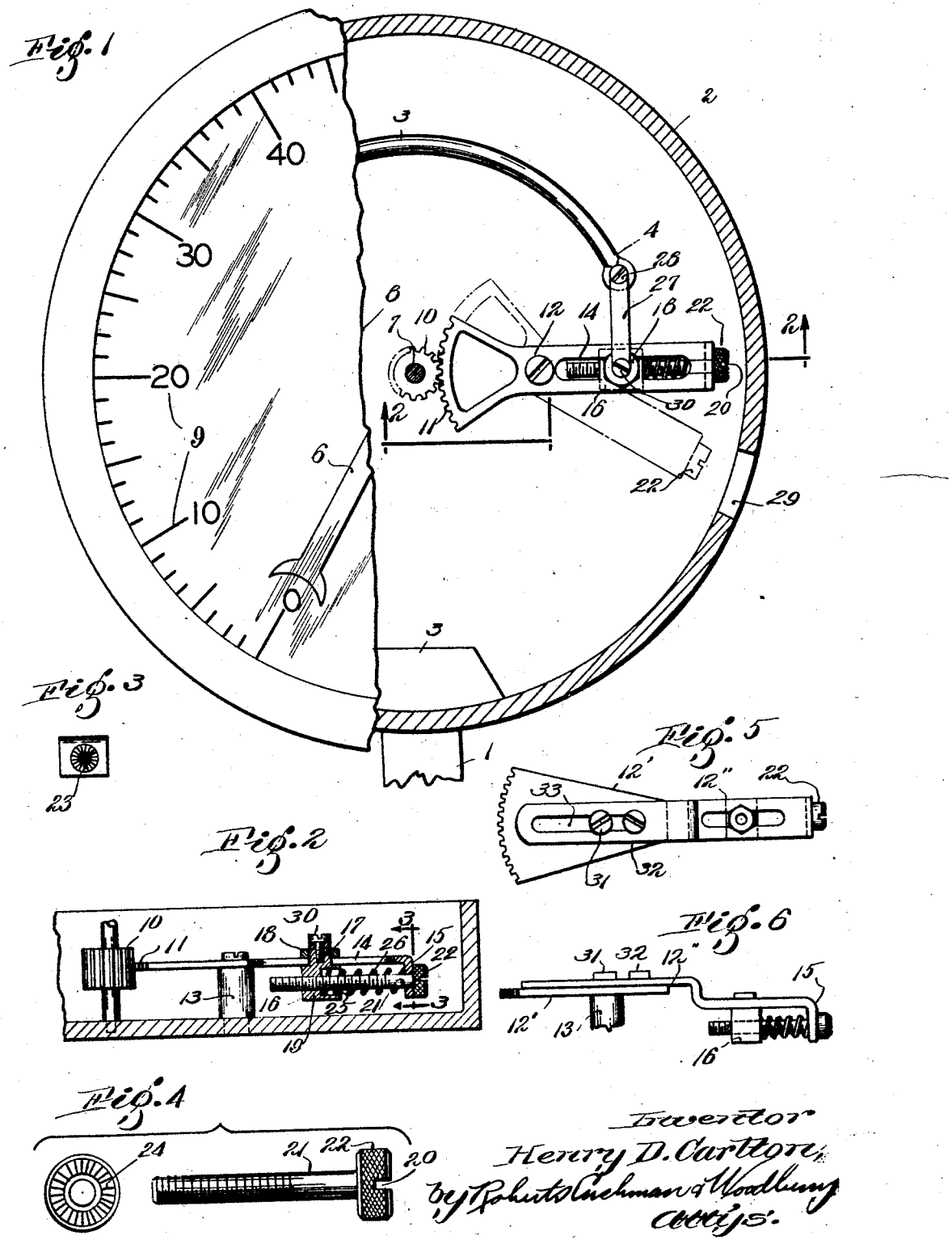

Patented May 10, 1932

1,857,139

UNITED STATES PATENT OFFICE

HENRY D. CARLTON, OF MONTCLAIR, NEW JERSEY, ASSIGNOR, BY MESNE ASSIGNMENTS, TO CONSOLIDATED ASHCROFT HANCOCK COMPANY, OF NEW YORK, N. Y., A CORPORATION OF DELAWARE

PRESSURE GAUGE INDICATOR

Application filed August 18, 1927. Serial No. 213,754.

This invention relates to indicating devices, such as pressure gauges, and affords means for accurately adjusting the actuating and recording elements thereof and positively retaining such adjustment.

In apparatus such as pressure gauges, and especially those of the Bourdon tube type, in which variations in pressure are indicated by the expansion or extension and contraction of the free end of an expansible tube, it is necessary to multiply such movements for the purpose of more accurate observation and record. Owing to the intrinsic variations in the specific properties of the materials used, it is also necessary, both in manufacture and in the course of the ordinary conditions of use, to adjust the relationship of the actuating and indicating parts so that the motion of the pressure tube (or actuating element) shall be transmitted to the indicator in the proper ratio and so that the desired range of values to be indicated shall correspond to those designated by the indicator dial.

Heretofore such adjustments of the actuating and indicating members have necessitated the disassembly of the apparatus, including the removal of the indicator and dial. As a consequence, it has been necessary to make an approximation of the adjustment required, with the indicator or dial removed, and then to replace the dial to determine whether the adjustment made is correct. If not, the dial must be removed again in order to make a second adjustment, and so forth, by trial and error, until a sufficiently correct approximation has been arrived at. For this reason it is extremely difficult to make a correction and often impracticable to repeat such experimentations until a satisfactorily accurate adjustment has been secured.

In apparatus heretofore used for such purposes, the parts, after adjustment, require tightening or locking in the adjusted position. Frequently, in thus securing the parts together, the adjustment is disturbed so that, although accurately corrected, it is again incorrect before the apparatus is ready to be put into use.

Accordingly, it is an object of the present invention to provide apparatus of the character described in which these difficulties and inaccuracies of adjustment are overcome and in which the instrument may be positively adjusted and will permanently retain the adjusted relationship. Other objects of the invention will appear from the following description.

The invention will be described with respect to its application to pressure gauges, a specific embodiment thereof being illustrated in the accompanying drawings, in which:

Fig. 1 is a front elevation of a gauge with a part of the dial and indicator broken away;

Fig. 2 is a section along the line 2—2 of Fig. 1;

Fig. 3 is a detail end view of the lever arm along line 3—3 of Fig. 2;

Fig. 4 is a detail side and end view of the adjustment screw;

Fig. 5 is a plan view of a modified form of the motion transmitting device; and

Fig. 6 is a side elevation of the same.

Referring to Figs. 1 and 2, the gauge includes a nipple 1 leading into the casing 2 of the gauge and connected in the usual way to one end of the Bourdon pressure tube 3, the other end 4 of which is free to respond to variations of pressure therein. In the center of the casing is mounted an indicator or pointer 6 upon the upper end of staff 7 which extends through the center of a dial 8 provided with suitable graduations 9 to indicate, for example, the number of pounds of steam pressure, etc. represented by a given movement of the pressure tube.

The staff 7 is provided with a toothed pinion 10 which meshes with a rack or gear sector 11 on the end of a lever arm 12. The latter is pivoted on a fixed post 13 and provided at its opposite end with a radially disposed slot 14 and a bent terminal piece 15. A sliding member such as a block 16, (having a stem 17 projecting upwardly through the slot 14 and retained in positon by lock nut 18 on its upper end) is threaded longitudinally, as at 19, to receive a screw-threaded adjusting member 21. This screw-threaded member 21 passes freely through an opening in the end piece 15 of the lever arm 12, and has a knurled head 22 at its outer end which is slotted to receive a screw driver at 20. The outer surface of the piece 15 is provided with radial detents 23 (as shown in Fig. 3) which engage corresponding detents 24 on the inner surface of the knurled head 22 (Fig. 4). The sliding block 16 is also provided with a recess 25 to receive one end of a compression spring 26 which surrounds the screw 21 and bears, at its opposite end, against the terminal piece 15. The upper end of the stem 17 may be pivoted to a link member 27 (as by screw 30) which is pivotally connected at its opposite end, by the screw 28 to the free end 4 of the Bourdon tube 3.

In operation of the gauge as thus constructed, an increase of steam pressure in the Bourdon tube 3 tends to straighten out the end of the tube 3. This motion is transmitted by link 27 through the block 16 to the lever arm 12 and in turn through the rack and pinion 11 and 10 to the pointer or indicator 6 which sweeps over the dial and indicates upon the scale 9 the pressure impressed upon the instrument. In case of no pressure, the lever arm 12 will assume the position indicated by dotted lines in Fig. 1, with its outer end disposed opposite to an opening 29 in the casing 2.

If adjustment between the actuating member and the indicator is required, this may be promptly effected by inserting a screw driver through the opening 29 into the slot 20 of knurled head 22 and turning the screw. The compression spring 26 normally forces the slide member 16 radially inward, thus drawing the head 22 against the projection 15. This forces the detents on the opposed surfaces of the head 22 and projection 15 into firm engagement, but upon positively turning the screw 21, these detent surfaces ride over each other and again mesh firmly upon release, thus preventing slippage in either direction.

The slide member 16 is thus positively adjusted lengthwise of the slot 14 and is positively and immediately retained in adjusted position against subsequent vibrations, shock, etc. under the conditions of use. Moreover, an extremely fine degree of movement is easily accomplished in this manner. Thus, for example, if the screw 21 has forty-eight threads corresponding to the linear inch and each detent represents 1/24 of a complete revolution of the screw, the movement of the screw head past one detent effects a corresponding movement of the slide member forward or backward of only 1/1052 of an inch. This is easily done, and requires no special skill or care on the part of the operator, whose whole attention may therefore be directed to the effect of such adjustment upon the indicator observed in terms of the resulting dial reading, by which it is immediately determined what further correction is required. When accurate adjustment is attained it is automatically retained by the interlocking of the opposed detent surfaces already described and also by engagement of the screw-threaded member 21 with the slide member 14 in conjunction with compression spring 26.

In the modified form of motion transmitting device shown in Figs. 5 and 6, in which like numerals indicate corresponding parts, the lever arm 12 is made in two sections—a pivoted part 12' and an extension member 12''. The former has a machine screw 31 which serves to fasten the same to post 13. A second machine screw 32 is disposed radially with respect to the first, and both of these screws pass through a slot 33 in the extension member 12'' to secure the members 12' and 12'' frictionally together. By sliding the sections 12' and 12'' relatively to each other and then tightening the screws 31 and 32, an extension or contraction and hence a corresponding approximate adjustment of the two sections may be readily secured. The more accurate adjustment of the device may then be obtained in the manner above described.

I claim:

1. A motion transmitting device for pressure gauges and the like, comprising a lever arm, a slide mounted to be moved longitudinally of the arm, a tension element tending to hold the slide in an extended position on said arm, and a screw element in threaded engagement with the slide and bearing against a part of said arm, to adjust and retain the slide in fixed relative position with respect to the arm, in opposition to the tension element.

2. In a pressure gauge, comprising a pressure responsive element and an indicator element, motion transmitting means interposed between said elements, including a lever, a member mounted to be slid longitudinally of the lever, a tension element tending to hold the slide member in an extended position on said arm, a screw element in threaded engagement with the slide member and bearing upon the arm in opposition to the tension element, to adjust and retain the slide member in fixed relative position with respect to the arm, and means connecting the slide member to the pressure responsive element.

3. In a pressure gauge, comprising a pressure responsive tube, an indicator dial, and a gear wheel carrying an indicating pointer thereon swinging over the dial, motion transmitting means interposed between the tube and the pointer, including a pivoted lever arm, a gear sector thereon meshing with the gear wheel of the indicating pointer, a slot in the lever arm, a slide freely movable therein, a stop member on the lever arm, a compression spring received between the slide and stop members, a machine screw in threaded engagement at one end with the slide, the other end passing freely through the stop member, and having an enlarged head thereon, intermeshing detents upon opposed surfaces of said stop member and screw head, and a link connecting the slide member to the free end of the pressure responsive tube.

4. A motion transmitting device for pressure gauges and the like comprising an actuating element, an indicator element, a lever member, an extension member adjustably mounted thereon, a member slidably mounted on said extension member, means pivotally connecting the actuating element to the slide member, means for positively adjusting and yieldably locking the relative position of the slide member to the extension member and means connecting the lever member to the indicator element.

5. In a pressure gauge, comprising a pressure tube and an indicator, motion transmitting means interposed between the tube and the indicator including a pivoted lever arm engaging the indicator, an extension member adjustably affixed thereto, a member slidably mounted upon the extension member, means connecting the slide member to the pressure tube, and means for positively adjusting and retaining the relative positions of the slide member and extension member.

6. In a pressure gauge, comprising a pressure tube and an indicator, motion transmitting means interposed between the tube and the indicator including a pivoted lever arm engaging the indicator, an extension member adjustably affixed thereto, a member slidably mounted upon the extension member, means connecting the slide member to the pressure tube, and screw-adjustment means having screw threaded engagement with the slide member and engaging the extension member for positively adjusting and retaining the relative positions of the slide member and extension member.

Signed by me at New York, New York, this 7th day of July, 1927.

HENRY D. CARLTON.